Figure 1:
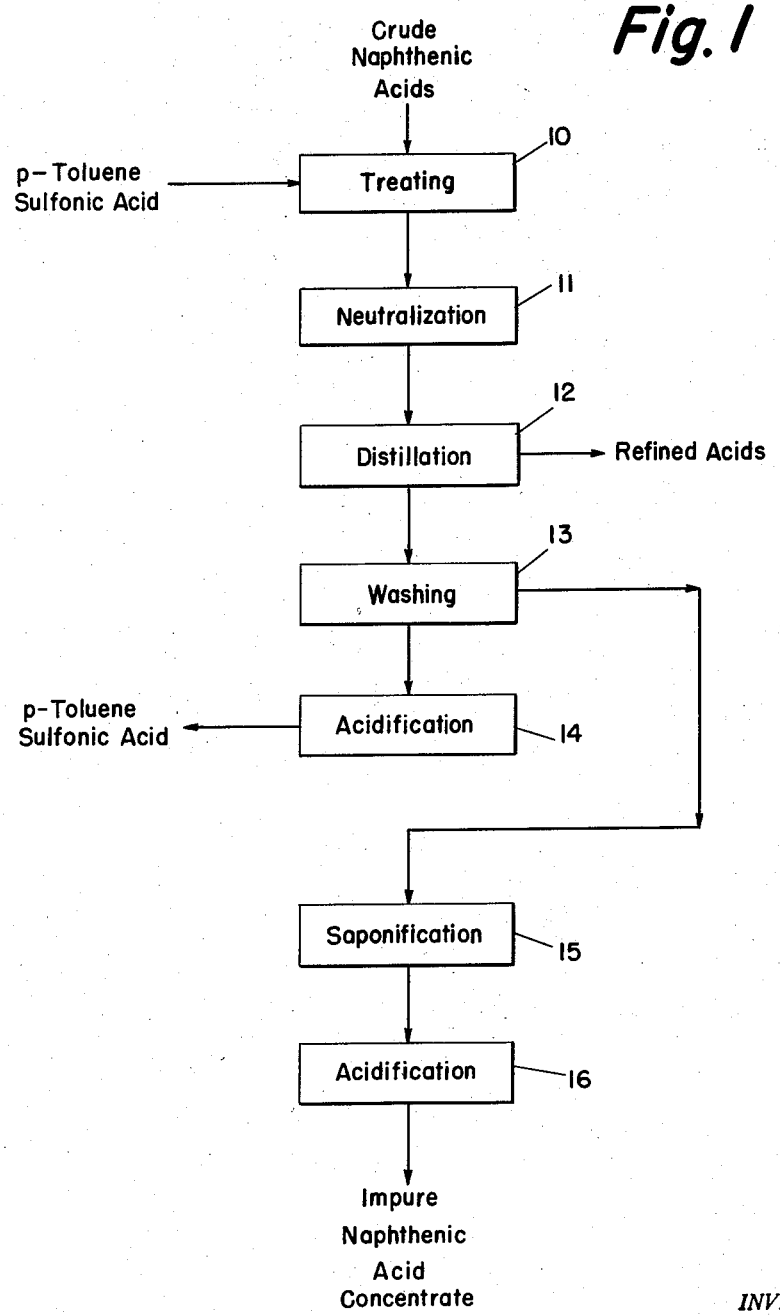

Jan. 13, 1959 J. L. JEZL 2,868,835
REFINING MINERAL OIL MATERIALS
Filed Nov. 10, 1953 2 Sheets-Sheet 2

INVENTOR.
JAMES L. JEZL
BY
Robert O. Spindle
ATTORNEY 2,868,835
REFINING MINERAL OIL MATERIALS James L. Jezl, Swarthmore, Pa., assignor to Sun Oil Company, Philadelphia, Pa., a corporation of New Jersey Application November 10, 1953, Serial No. 391,303

17 Claims. (Cl. 260—514)

This invention relates to the refining of mineral oil materials, and more particularly to the preparation of naphthenic acids or other mineral oil materials having improved color stability and other properties.

Naphthenic acids as originally recovered from petroleum generally are very dark in color, and contain substantial amounts of constituents which are reactive with bromine under the conditions of the bromine number determination of ASTM D875-46T. The bromine number of naphthenic acids is an important property thereof. For example, for use of alkali metal naphthenates in emulsion polymerization of butadiene compounds, it is important that the naphthenic acids from which the naphthenates are made should have low bromine number, e. g. not substantially greater than 6 mg. of bromine per gram of naphthenic acids.

According to the present invention, petroleum naphthenic acids are improved in properties by subjecting the naphthenic acids to acylating conditions substantially in the absence of an added acylatable reagent such as an esterforming alcohol. In one embodiment of the invention, this treatment is performed in the presence of an added acylating agent. In another embodiment of the invention, the treatment is performed in the absence of an added acylating agent. In either event, it has been found that the properties of the naphthenic acids are considerably improved; it is believed that the improvement is obtained by acylation of certain deleterious materials to form less objectionable acylation products or acylation products from which the naphthenic acids can be separated by distillation. When the treatment is performed in the absence of an added acylating agent, it is believed that the naphthenic acids themselves act as acylating agent and react with certain acylatable constituents of the naphthenic acids to produce the beneficial results of the invention.

Generally speaking, the acylating conditions which are employed according to the invention may be any conditions suitable for the acylation of organic hydroxy compounds generally. When the naphthenic acids themselves are the only acylating agent, an acylating catalyst is used, e. g. sulfuric acid, hydrochloric acid, phosphoric acid, toluene sulfonic acid, acetic acid, sulfonic acids, chlorinated acetic acid, ethyl sulfuric acid, ethyl sulfonic acid, boron fluorides, silicon fluorides, monosodium sulfate, zinc chloride, calcium chloride, zinc sulfate, nickel sulfate, copper sulfate, powdered metals, metal carboxylates, alumina, silica gel, etc. Instead of or in addition to an acylating catalyst, ultraviolet light, sonic or ultrasonic waves, or electrical vibrations may be employed. When an acid anhydride is used as acylating agent, an added acylation catalyst is not necessary, though it may be used if desired. Generally suitable acylation temperatures are those in the range from 200° F. to 500° F., preferably 250° F. to 400° F. A solvent such as xylene may be used if desired, in which case the acylation is preferably carried out under refluxing conditions. Generally the acylation will be satisfactorily effected in 0.5 to 32 hours, most usually in 3 to 12 hours.

When an added acylating agent is used, the amount employed is generally a minor amount relative to the amount of naphthenic acids used. Most frequently, 0.1 to 10 parts of added acylating agent per 100 parts of naphthenic acids will be employed. When an esterification catalyst is employed, the amount is generally in the range from 0.05 to 5 parts by weight per 100 parts of naphthenic acids and is generally less than the amount of acylating agent present, if any.

The preferred acylating agents used according to the invention are naphthenic anhydride and naphthenic acid halide and certain carboxylic acids and the corresponding anhydrides and acid halides, the anhydrides being preferred. The preferred carboxylic acids which can be used as such or in the form of the corresponding anhydride or acid halide are the following: aliphatic acids, including saturated and unsaturated acids, preferably having not more than 20 carbon atoms, e. g. acetic, propionic, butyric, caprylic, pelargonic, lauric, myristic, oleic, etc.; maleic acid; saturated acyclic dicarboxylic acids having at least 3 carbon atoms and preferably having not more than 10 carbon atoms, e. g. malonic, succinic, glutaric, adipic, azelaic, sebacic, etc.; phthalic acids i. e. homophthalic, isophthalic, and terephthalic; tetrahydrophthalic acids; hexahydrophthalic acids; etc.

The term, acid acylating agent, as used herein, means the acid in question, its anhydride, or acid halide; thus, for example, phthalic acid acylating agents include phthalic acid, phthalic anhydride, and phthalic acid chloride. Acid anhydrides, as contemplated here, include both internal anhydrides such as

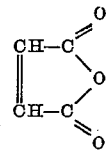

and external anhydrides such as

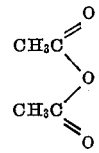

Figure 2:
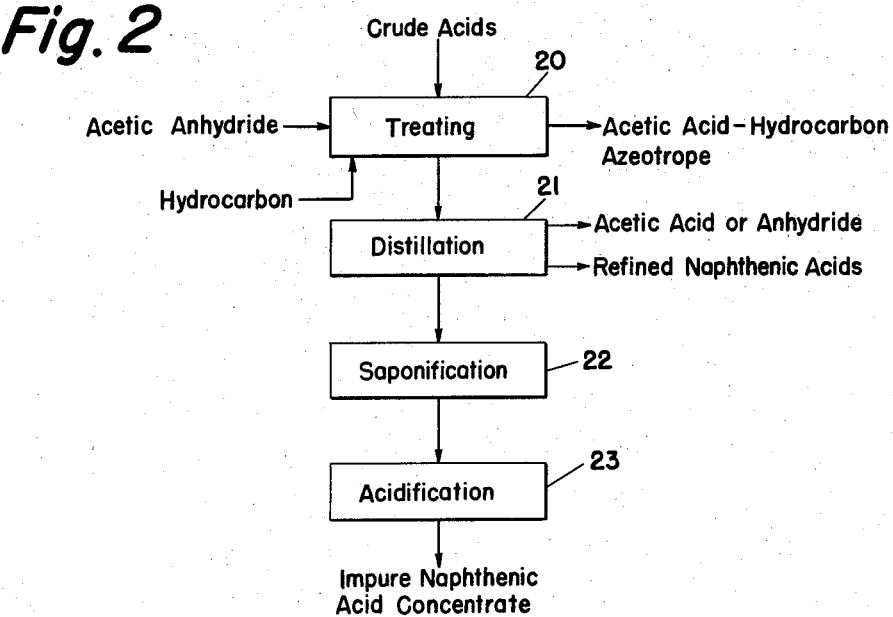
Figure 3:
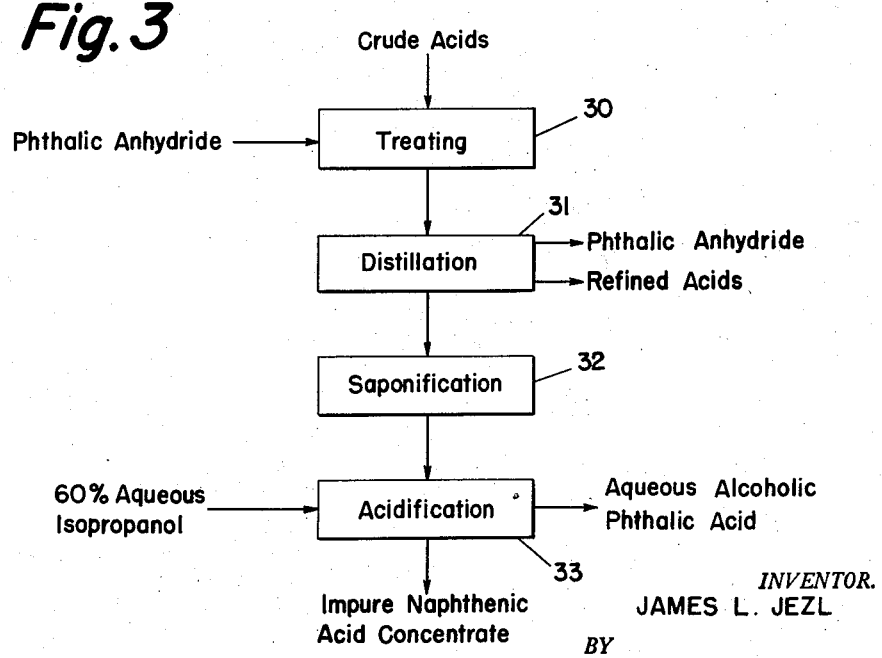

The invention will be further described with reference to the attached drawings, which illustrate the invention. Figure 1 is a flow sheet showing the treatment of crude naphthenic acids with an acylating catalyst in the absence of an added acylating agent. Figure 2 is a flow sheet showing the treatment of crude acids with acetic anhydride as acylating agent. Figure 3 is a flow sheet showing the treatment of crude acids with phthalic anhydride as acylating agent.

In operation according to Figure 1, crude naphthenic acids having poor color and odor and high bromine number are contacted in treating zone 10 with p-toluene sulfonic acid under acylating conditions. The reaction product is neutralized in neutralization zone 11, e. g. with sodium acetate, to convert the toluene sulfonic acid to its sodium salt, in order that excessive decomposition of toluene sulfonic acid should not occur in the subsequent distillation. The neutralized product is introduced into distillation zone 12 wherein vacuum distillation is effected, refined naphthenic acids being recovered as distillate. The residue contains sodium toluene sulfonate, residual naphthenic acids, and acylation products formed in previous steps. The sodium toluene sulfonate is washed out with water in washing zone 13, converted to toluene sulfonic acid in acidification zone 14, and may be re-used in treating zone 10. The residue, after removal of sodium toluene sulfonate, is saponified with caustic soda in saponification zone 15 under conditions to hydrolyze the acylation products. The saponification products are acidified in acidification zone 16 to obtain naphthenic acids in which the impurities removed from the refined acids by acylation are concentrated. This impure naphthenic acid concentrate may advantageously be used, in the form of alkali metal soap, in emulsifiable mineral lubricating compositions, wherein the impurities are not deleterious and instead may aid in inhibition of bacterial growth in the composition.

It is not essential to wash out sodium toluene sulfonate prior to saponification. If such washing is not performed, the toluene sulfonic acid formed in zone 16 enters the aqueous layer and may be recovered separate from the naphthenic acids.

Turning now to Fig. 2: crude naphthenic acids are contacted in treating zone 20 with acetic anhydride under acylating conditions. A hydrocarbon, e. g. 2,2,4-trimethyl pentane (commercial isooctane), boiling between 70° C. and 105° C., is present during the acylation, and by virtue of the fact that it forms an azeotrope with acetic acid but not with acetic anhydride, preferentially removes acetic acid from the treating zone. This favors obtaining the reaction between acetic anhydride and naphthenic acid to form naphthenic anhydride which in turn acylates the impurities in the naphthenic acids.

It is generally preferred that the acetic anhydride should react with a portion of the naphthenic acids to form naphthenic anhydride, and that the latter react with the acylatable materials to form naphthenyl acylation products, rather than the acetic anhydride reacting directly with the acylatable materials to form acetyl acylation products. Preferred conditions for formation of naphthenyl acylation products rather than acetyl acylation products include the use of relatively small amounts of acetic anhydride, e. g. 0.1 to 5 weight percent, more preferably 0.1 to 2 weight percent. The formation of naphthenyl acylation products is preferred, since they, being higher boiling than the acetyl acylation products, are more readily separated from the naphthenic acids by distillation. Prolonged heating, e. g. more than 5 hours, and relatively high temperatures, e. g. at least 300° F., also favor formation of naphthenyl acylation products.

The reaction product from treating zone 20 is vacuum distilled in distillation zone 21 to obtain refined naphthenic acids as distillate. Any acetic acid or acetic anhydride in the reaction product is recovered as a forerun distilling ahead of the naphthenic acids. The residue contains residual naphthenic acids, naphthenic anhydride, and acylation products formed in the previous treating step. The residue is saponified with caustic soda in saponification zone 22 under conditions to hydrolyze the acylation products. The saponification products are acidified in acidification zone 23 to obtain naphthenic acids in which the impurities removed from the refined acids by acylation are concentrated.

When using as acylating agent aliphatic monocarboxylic acids lower-boiling than the lightest ends of the naphthenic acid charge stock, the refined acid product can be recovered by distillation free of the acylating agent. Such operation is preferred unless there is no objection to the presence of the acylating agent in the refined acid product.

Turning now to Fig. 3: crude naphthenic acids are contacted in treating zone 30 with phthalic anhydride under acylating conditions. The phthalic anhydride may directly acylate the acylatable impurities, or the phthalic anhydride may react with naphthenic acids to form naphthenic anhydride, which acylates the impurities, or both mechanisms may occur. The direct phthalic anhydride acylation products have advantageously high boiling point because of the two carboxyl groups in the molecule.

The reaction product is vacuum distilled in distillation zone 31 to obtain refined naphthenic acids as distillate. In the case of relatively high-boiling naphthenic acids, any phthalic anhydride in the reaction product can be separated as forerun in the distillation. Any phthalic anhydride in the naphthenic acid distillate can be removed by extraction with aqueous alcohol, e. g. 60% aqueous isopropanol.

The residue from the distillation contains residual naphthenic acids and acylation products and may also contain naphthenic anhydride. The residue is saponified with caustic soda under hydrolyzing conditions in saponification zone 32. The saponification products are acidified in acidification zone 33 to obtain naphthenic acids in which the acylatable impurities are concentrated. Phthalic acid is removed from the naphthenic acids by extraction with 60% aqueous isopropanol. The phthalic acid thus removed can be recovered free from solvent by stripping off the latter by means not shown, and can be converted by suitable known means into phthalic anhydride for re-use in the treating step.

A similar procedure to that described above in connection with phthalic anhydride can also be used to advantage in connection with the relatively water-insoluble acyclic dibasic acids, e. g. suberic, azelaic, and sebacic. When maleic acid and the relatively water-soluble acyclic dibasic acids such as adipic and lower molecular weight acids are used, the acylating agent may be removed from naphthenic acids by extraction with water alone, rather than aqueous alcohol.

Concentrated aqueous alcohol is generally suitable for the extraction of dibasic acid acylating agents from the naphthenic acids. Alkanols having 1 to 4 carbon atoms, and concentrations from 40 to 70 percent are preferred.

An alternative method of separation of dibasic acid from naphthenic acid products is by fractional crystallization of the dibasic acid from a solution of the naphthenic acids in a diluent such as petroleum naphtha.

The following examples illustrate the invention:

*Example 1*

Naphthenic acids were obtained from petroleum by saponifying topped naphthenic crude, vacuum distilling to obtain lubricating oil distillates, acidifying the distillation residue, distilling the acidified residue to obtain a naphthenic acid distillate, and de-oiling the distillate by extracting soaps of the acid with naphtha. Methyl esters of the de-oiled acids were distilled to obtain a 400–425° F./5 mm. Hg fraction, which upon hydrolysis gave a naphthenic acid fraction having initial boiling point 366° F./2 mm. Hg and 95% point of 437° F./2 mm. Hg. This fraction had saponification number of 157.3 mg. of KOH per gram, bromine number (A. S. T. M. D875–46T) of 8.4, and NPA color above 8.

Two samples of this naphthenic acid fraction were heated at 250° F. for 4 hours, the first sample containing no added reagent, and the second containing 4% by weight of acetic anhydride. The following table shows a comparison of the properties of the products and the charge:

| | Bromine No. | NPA Color |
|---|---|---|
| Charge | 8.4 | Above 8. |
| Heated, no reagent | 9.2 | Above 8. |
| Heated, Ac₂O | 3.6 | Above 8. |

The sample heated with no added reagent was then distilled under vacuum to obtain a 0–90% distillate, and the sample heated with acetic anhydride was then distilled under vacuum to obtain a 5–80% distillate. The following table shows the properties of the distillates as compared with the original charge:

|  | Bromine No. | NPA Color |
|---|---|---|
| Charge | 8.4 | Above 8. |
| Heated, no reagent, 0-90% distillate | 8.7 | 3¾. |
| Heated, Ac₂O, 5-80% distillate | 3.2 | 2½. |

Standing at room temperature for two weeks showed no darkening of the distillate sample from the acetic anhydride treat, but a definite brown coloration in the distillate sample not acetic anhydride treated.

These results show that heating with acetic anhydride effects a large decrease in the bromine number and that distillation of the naphthenic acids after the heating with acetic anhydride somewhat further increases the bromine number and effects a large improvement in the color of the naphthenic acids. The treatment according to the example also improves the color stability.

*Example 2*

Petroleum naphthenic acids were treated with various acyalting agents and, in one run, with an esterification catalyst, toluene sulfonic acid, in the absence of an added acylating agent. Different naphthenic acid charge stocks were employed in the various runs.

The following table shows the bromine numbers obtained. In the treatments with acetic anhydride and naphthenic anhydride, the treatment consisted only of contacting with acylating agent in the absence of an esterification catalyst under the conditions indicated, followed in the case of acetic anhydride by vacuum distillation of the products to obtain the indicated naphthenic acid distillate fraction. In the treatments with phthalic anhydride and maleic anhydride, the treatment consisted of contacting with the acylating agent in the absence of an esterification catalyst under the conditions indicated, followed by contacting with the acylating agent in the presence of 1% of p-toluene sulfonic acid under the conditions indicated, and then followed by distillation to obtain the indicated naphthenic acid distillate fraction. In the treatment with maleic anhydride, 7½% of gas oil naphthenic acids were added after the first 4½ hours of the contacting in the presence of toluene sulfonic acid.

The table shows the initial bromine number of the charge stock and the bromine number of the naphthenic acids after each stage of the treatment.

reduction, though distillation is clearly beneficial in color improvement and in further reducing the bromine number below that obtained in the previous treatment.

The acylating agent employed according to the invention should be a stronger acylating agent than the naphthenic acids which are to be refined. In the light of the present specification, a person skilled in the art can determine whether a given acylating agent is suitable. In addition to the preferred acylating agents mentioned previously, the following are examples of carboxylic acylating agents which can be employed as such or in the form of the corresponding anhydride or acid halide: benzoic acid, toluic acid, phenylacetic acid, phenoxyacetic acid, cyclohexaneacetic acid, cyclohexane carboxylic acid, salicylic acid, etc.

Ketenes can also be used as acylating agents according to the invention, with or without an added catalyst such as sulfuric acid. Suitable ketenes include ketene itself, methyl ketene, ethyl ketene, dimethyl ketene, diethyl ketene, diphenyl ketene, etc. For the purpose of the present invention, ketenes, which are inner anhydrides of carboxylic acids, are to be regarded as organic carboxylic acid acylating agents.

In addition to naphthenic acids, the process of the invention may be employed in the refining of straight run mineral oil. Generally, the same acylating conditions are employed as in the treatment of naphthenic acids. Where the straight run mineral oil contains naphthenic acids, an acylation catalyst may be added and the oil subjected to acylating conditions to effect reaction between the naphthenic acids and the acylatable materials in the oil; or an acylating agent may be added and the oil subjected to acylating conditions to effect conversion of naphthenic acids to naphthenic anhydride. Where the mineral oil does not contain naphthenic acids, naphthenic acids constitute one of the acylating agents which may be added in the process of the invention.

The treatment, if any, subsequent to subjection of the oil to acylating conditions is also generally the same as that employed in the case of naphthenic acids, with the difference that excess acylating agent, or acylating agent recovered by saponification of a distillation residue, or the acylation product obtained by reaction of one molecule of a dibasic acid acylating agent with one molecule of acylatable material can be washed from the oil with caustic soda or other alkaline material, whereas such treatment is not feasible where naphthenic acids are the starting material.

| Run No. | 1 | 2 | 3 | 4 | 5 |
|---|---|---|---|---|---|
| Naphthenic Acid Charge: |  |  |  |  |  |
| Sap. No. | 157.3 | 174.7 | 142.6 | 142.5 | 167.9 |
| Br. No. | 8.4 | 5.9 | 6.6 | 11.7 | 9.0 |
| Acylating Agent | Acetic Anhydride | None | Phthalic Anhydride | Maleic Anhydride | Naphthenic Anhydride |
| Amount percent | 4 |  | 2 | 0.5 | 10 |
| Heating Without Catalyst: |  |  |  |  |  |
| Temp., °F | 250 |  | 280 | 310 | 300 |
| Time in hours | 4 |  | 3 | 7 | 24 |
| Br. No. of product | 3.6 |  | 5.0 | 10.7 | 6.8 |
| Heating with Toluene Sulfonic Acid: |  |  |  |  |  |
| Amount TSA, percent |  | 1 | 1 | 1 |  |
| Temp., °F |  | 350 | 320 | 310-320 |  |
| Time in hours |  | 11 | 12 | 24 |  |
| Br. No. of product |  |  |  | 8.1 |  |
| Distillation: |  |  |  |  |  |
| Percent Distillate | 5-80 | 0-75 | 0-80 | 0-50 |  |
| Br. No. of product | 3.2 | 2.8 | 3.9 | 4.8 |  |

The above table shows that each of the treatments provides a considerable decrease in the bromine number of the naphthenic acids. The table shows that the presence of an esterification catalyst such as toluene sulfonic acid is not essential to obtaining bromine number reduction with an anhydride reagent, though the presence of such catalyst is probably beneficial. The table also shows that distillation is not essential to obtaining bromine number In the treatment of oil according to the invention, amines, phenols, pyrroles, indoles, mercaptans, etc., may be converted by acylation to amides, esters, thioesters, ketones, etc. After the acylation step, unreacted acylating agent and the acylation products may be separated by distillation, contact with adsorbent, caustic washing, etc. For example, when acetic anhydride is used as acylating agent, the acetic acid formed may be removed as an azeotrope with an added hydrocarbon as described previously with regard to naphthenic acid treatment. When the acylation step is complete, unreacted acetic anhydride may be distilled out as a forecut or washed out with caustic soda, and the acylation products may be left in the oil, or they may be separated as a distillation residue, or they may be removed with clay or other adsorbent. When a dibasic acid anhydride is used as acylating agent, those acylation products which contain a free carboxyl group can be washed out with caustic, or removed as a distillation residue, or removed by clay treating. When acid halides are used as acylating agents, halogen acids which are formed in the reaction may be washed out with caustic.

When a ketene is used as acylating agent in the case of an oil containing naphthenic acids, an advantageous method is to add about ½ mole of ketene per mole of naphthenic acids in the oil. When this is done, substantial amounts of naphthenic anhydride are formed, and the latter, being quite high-boiling, remain in the residue upon subsequent distillation of the oil.

The following example illustrates the treatment of straight run mineral oil according to the invention:

*Example 3*

A lubricating oil distillate having S. U. viscosity at 100° F. of about 200 seconds was prepared by saponifying a topped naphthenic crude and vacuum distilling to obtain the distillate. This distillate had NPA color of 1¾. In a color stability test, wherein the oil was maintained at 220° F. for 16 hours, the NPA color was 3 at the end of the test.

The distillate was contacted with stirring at 300° F. for 3 hours with 4 parts by weight of acetic anhydride per 100 parts of oil. Unreacted acetic anhydride was stripped from the oil, and the latter was distilled under vacuum to obtain a 0–92% distillate having NPA color of 1½+. After 16 hours at 220° F., the oil had NPA color of 1½+, indicating very good color stability. The cast, or bloom, of the oil was also improved over the original distillate, and the stability of the bloom was also improved.

This example shows that the color stability and other properties of a straight run lubricating oil are considerably improved by treatment with acetic anhydride followed by distillation of the oil.

The process of the present invention can be employed in the treatment of either straight run mineral oil which may contain naphthenic acids, e. g., in amount up to 50 weight percent, or of naphthenic acids, which may contain oil, e. g. in amount less than 50 weight percent. Straight run mineral oils that may be treated according to the invention include, for example, normally liquid petroleum materials such as crude oil, gasoline, kerosene, mineral spirits, gas oil, furnace oil, stove oil, lubricating oil, transformer oil, etc.

The invention claimed is:

1. Method for refining petroleum naphthenic acids which comprises: contacting such naphthenic acids with a phthalic acid acylating agent at a temperature within the approximate range from 200° F. to 500° F.

2. Method for refining petroleum naphthenic acids which comprises: contacting such naphthenic acids with a maleic acid acylating agent at a temperature within the approximate range from 200° F. to 500° F.

3. Method for refining petroleum naphthenic acids which comprises: contacting such naphthenic acids with an aliphatic acid acylating agent at a temperature within the approximate range from 200° F. to 500° F.

4. Method according to claim 3 wherein said acylating agent is acetic anhydride.

5. Method for refining petroleum naphthenic acids which comprises: contacting such naphthenic acids with an acyclic saturated dibasic acid acylating agent at a temperature within the approximate range from 200° F. to 500° F.

6. Method according to claim 5 wherein said acylating agent is succinic anhydride.

7. Method according to claim 5 wherein said acylating agent is adipic anhydride.

8. Method for refining petroleum naphthenic acids which comprises: contacting such naphthenic acids with a material selected from the group consisting of naphthenic acid anhydride and naphthenic acid halide at a temperature within the approximate range from 200° F. to 500° F.

9. Method for refining petroleum naphthenic acids which comprises: contacting a charge stock consisting essentially of naphthenic acids and impurities contained therein as recovered from petroleum with 0.5 to 1.5 parts by weight of toluene sulfonic acid per 100 parts of naphthenic acid at a temperature in the range from 300° F. to 400° F.; neutralizing toluene sulfonic acid; and distilling naphthenic acids from the product of said contacting and neutralizing.

10. Method for refining petroleum naphthenic acids which comprises: contacting such naphthenic acids with 0.1 to 10 weight percent of phthalic anhydride at a temperature in the range from 200° F. to 500° F.; distilling naphthenic acids from the reaction product mixture; saponifying the distillation residue; acidifying the saponified distillation residue; contacting the acidified residue with concentrated aqueous alcohol to extract phthalic acid acylating agent from said acidified residue; and re-using said acylating agent to contact additional naphthenic acids.

11. Method for refining petroleum naphthenic acids which comprises: contacting such naphthenic acids with 0.1 to 10 weight percent of maleic anhydride at a temperature in the range from 200° F. to 500° F.; distilling naphthenic acids from the reaction product mixture; saponifying the distillation residue; acidifying the saponified distillation residue; contacting the acidified residue with water to extract maleic acid from said acidified residue; converting the extracted maleic acid to maleic anhydride; and re-using the maleic anhydride obtained to contact additional naphthenic acids.

12. Method for refining petroleum naphthenic acids which comprises: contacting such naphthenic acids with 0.1 to 5 weight percent of acetic anhydride at a temperature in the range from 200° F. to 500° F.; distilling acetic acid acylating agent from the reaction product mixture; and subsequently distilling and separately recovering naphthenic acids from the reaction product mixture.

13. Method according to claim 12 wherein said contacting is effected in the presence of a minor proportion of a hydrocarbon having normal boiling point in the range from 70° C. to 105° C.

14. Method for refining petroleum naphthenic acids which comprises: contacting such naphthenic acids with 0.1 to 10 weight percent of naphthenic anhydride at a temperature in the range from 200° F. to 500° F.; and distilling naphthenic acids from the reaction product mixture.

15. Method for refining petroleum naphthenic acids which comprises: contacting such naphthenic acids with 0.1 to 5 weight percent of toluene sulfonic acid at a temperature in the range from 250° F. to 400° F.; neutralizing the toluene sulfonic acid in reaction product mixture; distilling naphthenic acids from the neutralized mixture; saponifying the distillation residue; acidifying the saponified residue; recovering toluene sulfonic acid from the aqueous phase produced in said acidifying; and re-using the recovered toluene sulfonic acid to contact additional naphthenic acids.

16. Method for refining petroleum naphthenic acids which comprises contacting naphthenic acids at a temperature in the approximate range from 200° F. to 500° F. with an organic acylating catalyst, thereby to react a portion of the naphthenic acids with impurities contained in said naphthenic acids, and separating the treated naphthenic acids from the reaction products.

17. Method for refining petroleum naphthenic acids which comprises contacting naphthenic acids at a temperature within the approximate range from 200° F. to 500° F. with a treating agent selected from the group consisting of a carboxylic acid, a carboxylic acid anhydride and a carboxylic acid halide, thereby to react said treating agent with impurities contained in said naphthenic acids, and separating the treated naphthenic acids from said treating agent and from the reaction products.

References Cited in the file of this patent

UNITED STATES PATENTS

| | | |
|---|---|---|
| 1,802,336 | Cook | Apr. 22, 1931 |
| 2,018,715 | Fulton | Oct. 29, 1935 |
| 2,072,053 | Hendrey | Feb. 23, 1937 |
| 2,263,176 | Lazar | Nov. 18, 1941 |
| 2,301,528 | Ewing | Nov. 10, 1942 |
| 2,447,190 | Linford | July 26, 1949 |
| 2,494,133 | Jefts | Jan. 10, 1950 |
| 2,608,520 | Arundale et al. | Aug. 28, 1952 |
| 2,656,380 | Turner | Oct. 20, 1953 |

FOREIGN PATENTS

| | | |
|---|---|---|
| 12,606 | Great Britain | Oct. 17, 1907 |
| 352,917 | Germany | May 5, 1922 |
| 403,134 | Germany | Sept. 23, 1924 |